(12) United States Patent
Paek et al.

(10) Patent No.: US 7,689,420 B2
(45) Date of Patent: Mar. 30, 2010

(54) PERSONALIZING A CONTEXT-FREE GRAMMAR USING A DICTATION LANGUAGE MODEL

(75) Inventors: Timothy S. Paek, Sammamish, WA (US); David M. Chickering, Bellevue, WA (US); Eric Norman Badger, Issaquah, WA (US); Qiang Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 11/278,899

(22) Filed: Apr. 6, 2006

(65) Prior Publication Data

US 2007/0239454 A1 Oct. 11, 2007

(51) Int. Cl.
*G10L 15/00* (2006.01)
*G10L 17/00* (2006.01)
*G10L 15/28* (2006.01)

(52) U.S. Cl. ..................... 704/257; 704/250; 704/255

(58) Field of Classification Search ............... 704/9, 704/257, 250, 255
See application file for complete search history.

(56) References Cited

U.S. PATENT DOCUMENTS

| | | | |
|---|---|---|---|
| 4,713,778 A | 12/1987 | Baker et al. | |
| 4,748,670 A | 5/1988 | Bahl et al. | |
| 5,005,203 A | 4/1991 | Ney | |
| 6,044,347 A | 3/2000 | Abella et al. | |
| 6,301,560 B1 * | 10/2001 | Masters | ................ 704/251 |
| 6,434,523 B1 | 8/2002 | Monaco et al. | |
| 6,694,296 B1 | 2/2004 | Alleva et al. | |
| 6,836,760 B1 | 12/2004 | Bellegarda et al. | |
| 6,839,680 B1 | 1/2005 | Liu et al. | |
| 6,865,528 B1 | 3/2005 | Huang et al. | |
| 6,957,184 B2 | 10/2005 | Schmid et al. | |
| 6,993,586 B2 | 1/2006 | Chen et al. | |
| 7,031,908 B1 * | 4/2006 | Huang et al. | ................ 704/9 |
| 7,200,559 B2 | 4/2007 | Wang | |
| 7,203,909 B1 | 4/2007 | Horvitz et al. | |
| 7,389,234 B2 | 6/2008 | Schmid et al. | |

(Continued)

FOREIGN PATENT DOCUMENTS

| | | |
|---|---|---|
| EP | 0899737 | 3/1999 |
| GB | 2390930 | 1/2004 |

OTHER PUBLICATIONS

Souvignier et al. "The thoughtful elephant: Strategies for spoken dialog systems", IEEE Trans. on speech and audio processing, 2000.*

(Continued)

*Primary Examiner*—Richmond Dorvil
*Assistant Examiner*—Jialong He
(74) *Attorney, Agent, or Firm*—Lee & Hayes, PLLC

(57) ABSTRACT

Architecture for integrating and generating back-off grammars (BOG) in a speech recognition application for recognizing out-of-grammar (OOG) utterances and updating the context-free grammars (CFG) with the results. A parsing component identifies keywords and/or slots from user utterances and a grammar generation component adds filler tags before and/or after the keywords and slots to create new grammar rules. The BOG can be generated from these new grammar rules and can be used to process the OOG user utterances. By processing the OOG user utterances through the BOG, the architecture can recognize and perform the intended task on behalf of the user.

16 Claims, 13 Drawing Sheets

U.S. PATENT DOCUMENTS

| | | | |
|---|---|---|---|
| 2001/0016814 A1* | 8/2001 | Hauenstein | 704/231 |
| 2001/0047265 A1* | 11/2001 | Sepe, Jr. | 704/275 |
| 2002/0013706 A1 | 1/2002 | Profio et al. | |
| 2002/0123876 A1* | 9/2002 | Pokhariyal et al. | 704/1 |
| 2002/0152071 A1 | 10/2002 | Chaiken et al. | |
| 2003/0009335 A1* | 1/2003 | Schalkwyk et al. | 704/257 |
| 2003/0195739 A1* | 10/2003 | Washio | 704/1 |
| 2004/0220809 A1 | 11/2004 | Wang et al. | |
| 2004/0254957 A1 | 12/2004 | Hyotyniemi et al. | |
| 2004/0267518 A1 | 12/2004 | Kashima et al. | |
| 2005/0038650 A1* | 2/2005 | Bellegarda et al. | 704/231 |
| 2005/0154580 A1* | 7/2005 | Horowitz et al. | 704/9 |
| 2006/0009973 A1* | 1/2006 | Nguyen et al. | 704/257 |
| 2006/0129396 A1* | 6/2006 | Ju et al. | 704/243 |
| 2006/0129397 A1* | 6/2006 | Li et al. | 704/245 |
| 2006/0173686 A1* | 8/2006 | Hwang | 704/257 |
| 2006/0190253 A1 | 8/2006 | Hakkani-Tur et al. | |
| 2006/0277031 A1 | 12/2006 | Ramsey | |

OTHER PUBLICATIONS

Balakrishna et al. "Automatic creation and tuning of context free grammars for interactive voice response systems", IEEE, Proceedings of natural language processing and knowledge engineering, 2005.*

U.S. Appl. No. 11/278,893, Paek, et al.

U.S. Appl. No. 11/393,321, Paek, et al.

G. Gorrell, "Using Statistical Language Modelling to Identify New Vocabulary in a Grammar-Based Speech Recognition System", In Proceedings of the 8th European Conference on Speech Communication and Technology (Eurospeech), 2003, pp. 2729-2732, Geneva.

Sorin Dusan, et al., "Adaptive Dialog Based upon Multimodal Language Acquisition," Proceedings of the Fourth IEEE International Conference on Multimodal Interfaces (ICMI'02), 2002, 6 pages.

Wang, et al., "Spoken Language Understanding", IEEE Signal Processing Magazine, Sep. 2005, pp. 16-31.

Webb, et al., "Data-Driven Language Understanding for Spoken Language Dialogue", in Proceedings of the AAAI Workshop on Spoken Language Understanding, 2005, 7 pages, Pittsburgh.

Bell, et al., "Real-time Handling of Fragmented Utterances", In Proceedings of NAACL 2001, 2001, 7 pages.

Akiba, et al., "Selective Back-Off Smoothing for Incorporating Grammatical Constraints into the N-Gram Language Model", In Proceedings of the International Conference on Spoken Language Processing, Sep. 2002, pp. 881-884, vol. 2.

Knight, et al., "Comparing grammar-based and robust approaches to speech understanding: a case study", In Eurospeech, 2001, 4 pages.

OA Dated Nov. 28, 2008 for U.S. Appl. No. 11/278,893, 34 pages.

Hockey, et al. Targeted Help for Spoken Dialogue Systems: Intelligent Feedback Improves Naïve Users Performance. Proc. EACL, pp. 147-154, 2003.

Billsus, et al., "A Personal News Agent that Talks, Learns and Explains", Proceedings of the 3rd Annual Conference on Autonomous Agents, 1999, pp. 268-275.

Han, et al., "Synthetic Character with Bayesian Network and Behavior Network for Intelligent Smartphone", Department of Computer Science, Yonsei University, Korea, KES 2005, LNAI 3681, pp. 737-743.

Horvitz, et al., "In Pursuit of Effective Handsfree Decision Support: Coupling Bayesian Inference, Speech Understanding, and User Models", retrieved on May 1, 2006 at <<http://change2.it.jcu.edu.au/~phillip/sit/honours/effective-handsfree.pdf>>, Nineteenth Annual Symposium on Computer Applications in Medical Care, Toward Cost-Effective Clinical Computing, 1995, 8 pages.

Paek, et al., "Conversation as Action Under Uncertainty", Proceedings of the 16th Conference on Uncertainty in Artificial Intelligence, 2000, 10 pages.

Thompson, et al., "A Personalized System for Conversational Recommendations", Journal of Artificial Intelligence Research 21, 2004, pp. 393-428.

\* cited by examiner

US 7,689,420 B2

PERSONALIZING A CONTEXT-FREE GRAMMAR USING A DICTATION LANGUAGE MODEL

CROSS-REFERENCE TO RELATED APPLICATIONS

This application is related to co-pending U.S. patent application Ser. No. 11/278,893, entitled, "AUGMENTING CONTEXT-FREE GRAMMARS WITH BACK-OFF GRAMMARS FOR PROCESSING OUT-OF-GRAMMAR UTTERANCES", and filed on Apr. 6, 2006, the entirety of which is incorporated by reference herein.

BACKGROUND

Typical speech recognition applications (e.g., command-and-control (C&C) speech recognition) allow users to interact with a system by speaking commands and/or asking questions restricted to fixed, grammar-containing pre-defined phrases. While speech recognition applications have been commonplace in telephony and accessibility systems for many years, only recently have mobile devices had the memory and processing capacity to support not only speech recognition, but a whole range of multimedia functionalities that can be controlled by speech.

Furthermore, the ultimate goal of the speech recognition technology is to be able to produce a system that can recognize with 100% accuracy all of the words that are spoken by any person. However, even after years of research in this area, the best speech recognition software applications still cannot recognize speech with 100% accuracy. For example, most commercial speech recognition applications utilize context-free grammars for C&C speech recognition. Typically, these grammars are authored such that they achieve broad coverage of utterances while remaining relatively small for faster performance. As such, some speech recognition applications are able to recognize over 90% of the words, when spoken under specific constraints regarding content and/or acoustic training has been performed to recognize the speaker's speech characteristics.

Unfortunately, despite attempts to cover all possible utterances for different commands, users occasionally produce expressions that fall outside of the grammars (e.g., out-of-grammar (OOG) user utterances). For example, if a user forgets the expression for battery strength, or simply does not read the instructions, and utters an OOG utterance, the speech recognition application will often either produce a recognition result with very low confidence or no result at all. This can lead to the speech recognition application failing to complete the task on behalf of the user. Further, if users unknowingly believe and expect that the speech recognition application should recognize the utterance, the user would conclude that the speech recognition application is faulty or ineffective, and cease from using the product.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovation facilitates integration and generation of back-off grammar (BOG) rules for processing out-of-grammar (OOG) utterances not recognized by context-free grammar (CFG) rules.

Accordingly, the invention disclosed and claimed herein, in one aspect thereof, comprises a system for generating a BOG in a speech recognition application. The system can comprise a parsing component for identifying keywords and/or slots from user utterances and a grammar generation component for adding filler tags before and/or after the keywords and slots to create new grammar rules. The BOG can be generated from these new grammar rules and used to process OOG user utterances not recognized by the CFG.

All user utterances can be processed through the CFG. The CFG defines grammar rules which specify the words and patterns of words to be listened for and recognized, and consists of at least three constituent parts (e.g., carrier phrases, keywords and slots). If the CFG fails to recognize the user utterance, it can be identified as an OOG user utterance. A processing component can then process the OOG user utterance through the BOG to generate a recognized result. The CFG can then be updated with the newly recognized OOG utterance.

In another aspect of the subject innovation, the system can comprise a personalization component for updating the CFG with the new grammar rules and/or OOG user utterances. The personalization component can also modify the CFG to eliminate phrases that are not commonly employed by the user so that it remains relatively small in size to ensure better search performance. Thus, the CFG can be tailored specifically for each individual user. Furthermore, the CFG can either be automatically updated or a user can be queried for permission to update. The system can also engage in a confirmation of the command with the user, and if the confirmation is correct, the system can add the result to the CFG.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
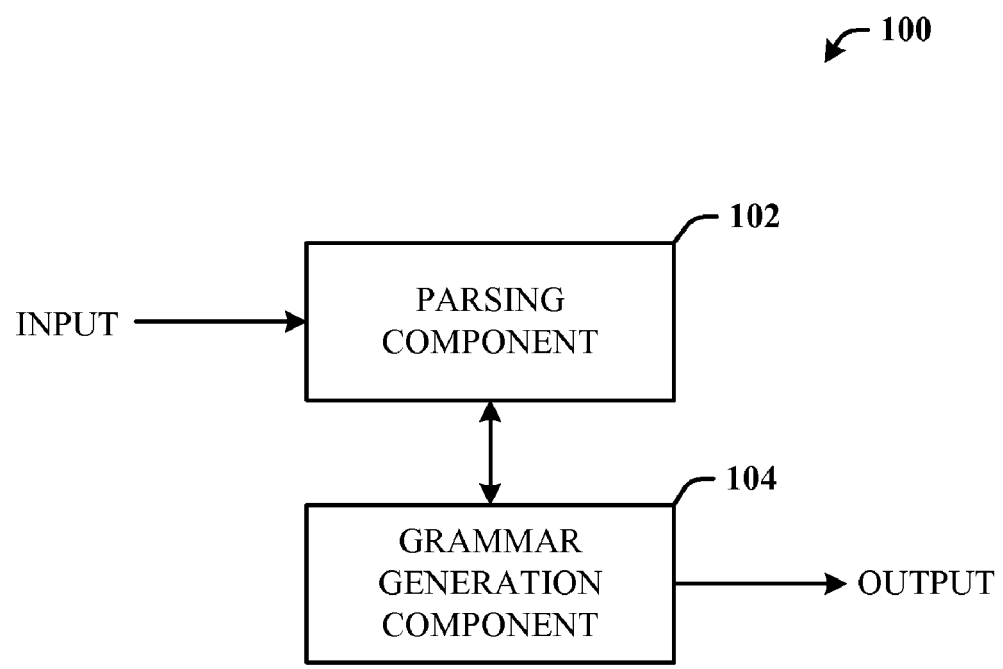
FIG. 1 illustrates a block diagram of a system for generating a back-off grammar in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "handler," "model," "system," and the like are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Speech recognition applications, such as command-and-control (C&C) speech recognition applications allow users to interact with a system by speaking commands and/or asking questions. Most of these speech recognition applications utilize context-free grammars (CFG) for speech recognition. Typically, a CFG is created to cover all possible utterances for different commands. However, users occasionally produce expressions that fall outside of the CFG. Expressions that fall outside of the CFG are delineated as out-of-grammar (OOG) utterances. The invention provides a system for generating back-off-grammars (BOG) for recognizing the OOG utterances and updating the CFG with the OOG utterances.

Furthermore, the CFG can be authored to achieve broad coverage of utterances while remaining relatively small in size to ensure fast processing performance. Typically, the CFG defines grammar rules which specify the words and patterns of words to be listened for and recognized. Developers of the CFG grammar rules attempt to cover all possible utterances for different commands a user might produce. Unfortunately, despite attempts to cover all possible utterances for different commands, users occasionally produce expressions that fall outside of the grammar rules (e.g., OOG utterances). When processing these OOG user utterances, the CFG typically returns a recognition result with very low confidence or no result at all. Accordingly, this could lead to the speech recognition application failing to complete the task on behalf of the user.

Generating new grammar rules to identify and recognize the OOG user utterances is desirable. Accordingly, an OOG user utterance which is recognized, is an OOG user utterance mapped to its intended CFG rule. Disclosed herein is a system for generating a BOG for identifying and recognizing the OOG utterances. The BOG can be grammar rules that have been wholly or partially generated, where the rules that are re-written are selected using a user model or heuristics. Furthermore, the grammar rules can be generated offline or dynamically in memory depending on disk space limitations. By identifying and recognizing OOG user utterances via the BOG, the system can update the CFG with the OOG user utterances and educate users of appropriate CFG phrases. Accordingly, the following is a description of systems, methodologies and alternative embodiments that implement the architecture of the subject innovation.

Referring initially to the drawings, FIG. 1 illustrates a system 100 that generates BOG rules in a speech recognition application in accordance with an innovative aspect. The system 100 can include a parsing component 102 that can take as input a context-free grammar (CFG).

Most speech recognition applications utilize CFG rules for speech recognition. The CFG rules can define grammar rules which specify the words and patterns of words to be listened for and recognized. In general, the CFG rules can consist of at least three constituent parts: carrier phrases, keywords and slots. Carrier phrases are text that is used to allow more natural expressions than just stating keywords and slots (e.g., "what is," "tell me," etc.). Keywords are text that allow a command or slot from being distinguished from other commands or slots. For example, the keyword "battery" appears only in the grammar rule for reporting device power. Slots are dynamically adjustable lists of text items, such as, <contact name>, <date>, etc.

Although all three constituent parts play an important role for recognizing the correct utterance, only keywords and slots are critical for selecting the appropriate command. For example, knowing that a user utterance contains the keyword "battery" is more critical than whether the employed wording was "What is my battery strength?" or "What is the battery level?" Keywords and slots can be automatically identified by parsing the CFG rules. Typically, slots are labeled as rule references, and keywords can be classified using heuristics, such as keywords are words that only appear in one command, or only before a slot. Alternatively, besides automatic classification, slots and keywords can be labeled by the grammar authors themselves.

Developers of the CFG rules attempt to cover all possible utterances for different commands a user might produce. Unfortunately, despite attempts to cover all possible utterances for different commands, users occasionally produce expressions that fall outside of the grammar rules (e.g., OOG utterances). For example, if the CFG rules are authored to anticipate the expression "What is my battery strength?" for reporting device power, then a user utterance of "Please tell me my battery strength." would not be recognized by the CFG rules and would be delineated as an OOG utterance. Generally, the CFG rules can process the user utterances and produce a recognition result with high confidence, a recognition result with low confidence or no recognition result at all.

The parsing component 102 can then identify keywords and/or slots of the context free grammar. Having identified the keywords and/or slots, a grammar generation component 104 can add filler tags before and/or after the keywords and/or slots to create new grammar rules. Filler tags can be based on both garbage tags and/or dictation tags. Garbage tags (e.g., "<WILDCARD>" or " . . . " in a speech API) look for specific words or word sequences and treat the rest of the words like garbage. For example, for a user utterance of "What is my battery strength?" the word "battery" is identified and the rest of the filler acoustics are thrown out. Dictation tags (e.g., "<DICTATION>" or "*" in a speech API (SAPI)) match the filler acoustics against words in a dictation grammar. For example, a CFG rule for reporting device power: "What is {my|the} battery {strength}|level}?" can be re-written as " . . . battery . . . " or "*battery" in a new grammar rule. Alternatively, new grammar rules can also be based on phonetic similarity to keywords, instead of exact matching of keywords (e.g., approximate matching). Accordingly, the grammar generation component 104 can generate BOG rules based in part on the combination of these new grammar rules.

The BOG rules can be generated in whole, where all the grammar rules of the original CFG rules are re-written to form new grammar rules based on combining the slots, keywords and filler tags as described supra. The BOG rules can also be generated in part, where only a portion of the CFG rules are re-written to form new grammar rules. The BOG rules can employ the same rules as the original CFG rules, along with the re-written grammar rules. However, executing the BOG rules can be, in general, more computationally expensive than running the original CFG rules, so the less rules that are re-written, the less expensive the BOG rules can be. Thus, the BOG rules can be grammar rules that have been wholly or partially generated, where the grammar rules that are re-written are selected using a user model (e.g., a representation of the systematic patterns of usage displayed by the user) and/or heuristics, such as re-written grammar rules are rules that are frequently employed by the user, or rules never employed by the user.

The new grammar rules comprising the BOG rules can then be employed for identifying and recognizing OOG user utterances. Although the CFG rules generally recognize user utterances with better performance than the BOG rules, the CFG rules can have difficulty processing OOG user utterances. Specifically, the CFG rules constrain the search space of possible expressions, such that if a user produces an utterance that is covered by the CFG rules, the CFG rule can generally recognize the utterance with better performance than the BOG rules with filler tags, which generally have a much larger search space. However, unrecognized user utterances (e.g., OOG user utterances) can cause the CFG rules to produce a recognition result with lower confidence or no result at all, as the OOG user utterance does not fall within the pre-conscribed CFG rules. Whereas, the BOG rules employing the re-written grammar rules can typically process the OOG user utterance and produce a recognition result with much higher confidence.

For example, the CFG rule: "What is {my|the} battery {strength}|level}?" can fail to recognize the utterance, "Please tell me how much battery I have left." Whereas, the re-written grammar rules " . . . battery . . . " and "*battery*" of the BOG rules can produce a recognition result with much higher confidence. In fact, the dictation tag rule of the BOG rules can also match the carrier phrase "Please tell me how much" and "I have left" which can be added in some form or another to the original CFG rule to produce a recognition result with much higher confidence as well, especially if the user is expected to use this expression frequently.

Accordingly, the BOG rules can be used in combination with the CFG rules to identify and recognize all user utterances in the speech recognition application. Further, once the user utterances are identified and recognized, the updated results can be output as speech and/or action/multimedia functionality for the speech recognition application to perform.

Figure 2:
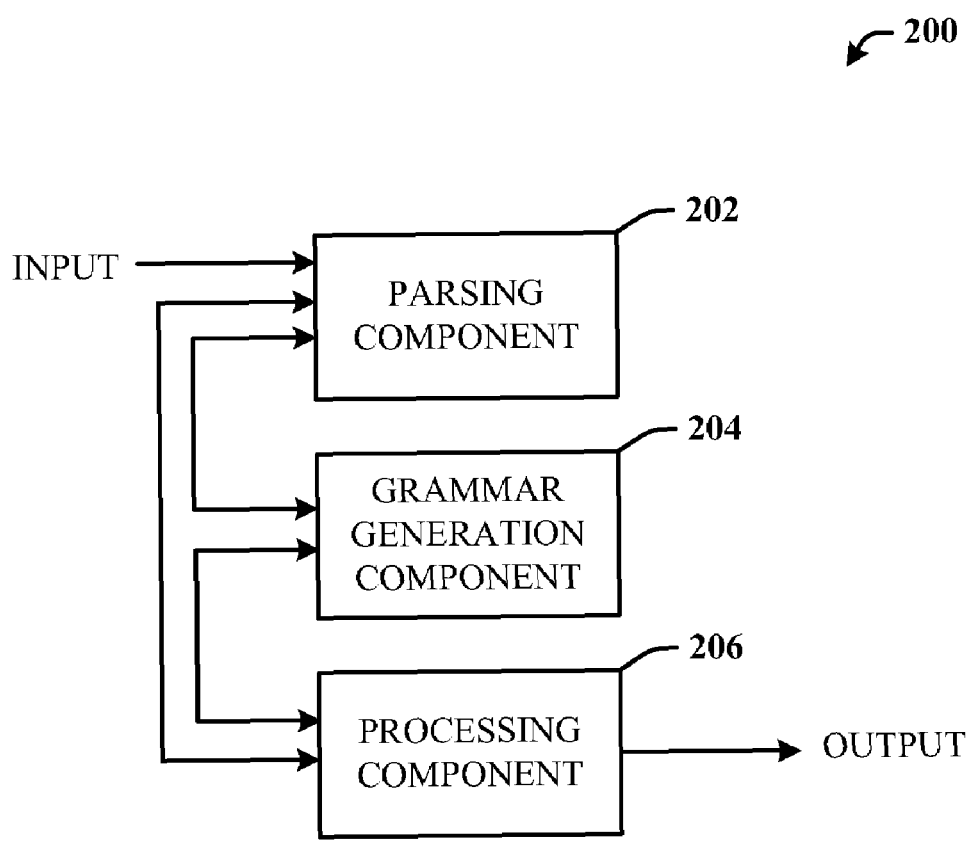
FIG. 2 illustrates a block diagram of a BOG generation system that further includes a processing component for processing an OOG utterance using the BOG.

In another implementation illustrated in FIG. 2, a system 200 is provided that generates BOG rules in a speech recognition application that further includes a processing component 206. As stated supra, a parsing component 202 (similar to parsing component 102) can identify keywords and/or slots from the input OOG user utterances. Once the keywords and/or slots are identified, a grammar generation component 204 can generate a new grammar rule based in part on the OOG user utterance. The new grammar rules comprise the BOG rules. The processing component 206 can then process the OOG user utterances based in part on the re-written grammar rules of the BOG rules to produce a recognition result with higher confidence than that obtained by the CFG rules. Typically, both the CFG rules and the BOG rules can process all user utterances in the speech recognition application. However, the CFG rules and the BOG rules can process the user utterances in numerous ways. For example, the system 200 can first utilize the CFG rules to process the user utterance as a first pass, since the CFG rules generally perform better on computationally limited devices. If there is reason to believe that the user utterance is an OOG user utterance (as known via heuristics or a learned model), by saving a file copy of the user utterance (e.g., .wav file), the system 200 can process the user utterance immediately with the BOG rules as a second pass.

Alternatively, the system 200 can process the user utterance with the BOG rules only after it has attempted to take action on the best recognition result (if any) using the CFG rules. Another implementation can be to have the system 200 engage in a dialog repair action, such as asking for a repeat of the user utterance or confirming its best guess, and then processing the user utterance via the BOG rules. Still another construction can be to use both the CFG rules and the BOG rules simultaneously to process the user utterance. Thus, with the addition of the BOG rules the system 200 provides more options for identifying and recognizing OOG user utterances.

Figure 3:
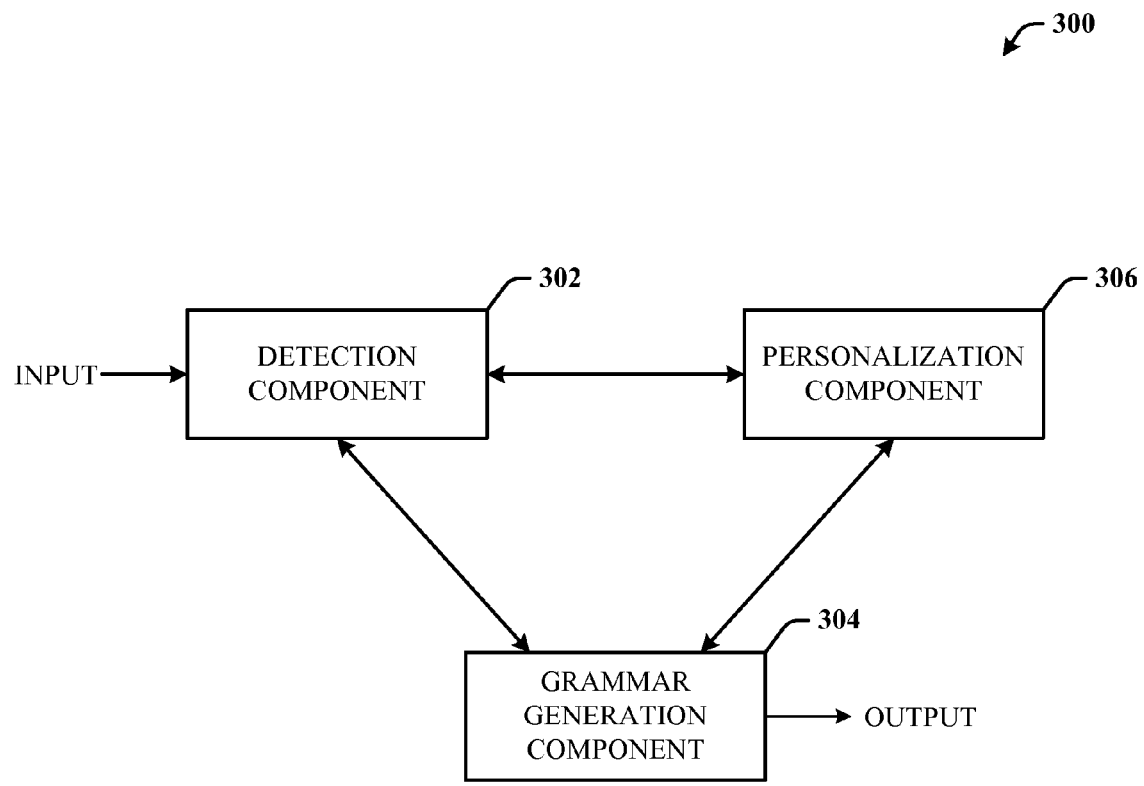
FIG. 3 illustrates a block diagram of a grammar generating system including a personalization component for updating a CFG.

In another implementation illustrated in FIG. 3, a system 300 is illustrated that generates dictation language model grammar rules for processing OOG user utterances. The system 300 includes a detection component 302 that can take as input an audio stream of user utterances. As stated supra, the user utterances are typically raw voice/speech signals, such as spoken commands or questions restricted to fixed, grammar-containing, pre-defined phrases that can contain speech content that matches at least one grammar rule. Further, the user utterances can be first processed by CFG rules (not shown). Most speech recognition applications utilize CFG rules for speech recognition. Generally, the CFG rules can process the user utterances and output a recognition result indicating details of the speech content as applied to the CFG rules.

The detection component 302 can identify OOG user utterances from the input user utterances. As stated supra, OOG user utterances are user utterances not recognized by the CFG rules. Once an OOG user utterance is detected, a grammar generation component 304 can generate a new grammar rule based in part on the OOG user utterance. The grammar generation component 304 can add filler tags before and/or after keywords and/or slots to create new grammar rules. Filler tags are based on dictation tags. Dictation tags (e.g., "<DICTATION>" or "*" in SAPI) match the filler acoustics against words in a dictation grammar. Alternatively, instead of using exact matching of keywords, the system 300 can derive a measure of phonetic similarity between dictation text and the keywords. Thus, new grammar rules can also be based on phonetic similarity to keywords (e.g., approximate matching).

The new grammar rules comprising the dictation language model grammar rules can then be employed for identifying and recognizing OOG user utterances. Specifically, the dictation language model grammar rules can be comprised of either full dictation grammar rules or the original CFG rules with the addition of dictation tags around keywords and slots. The dictation language model grammar rules can also be generated in part, where only a portion of the CFG rules are re-written to form new grammar rules. The dictation language model grammar rules can employ the same rules as the original CFG rules, along with the re-written grammar rules. However as stated supra, running the dictation language model grammar rules can be in general more computationally expensive than running the original CFG rules, so the less rules that are re-written the less expensive the dictation language model grammar rules can be. Thus, the dictation language model grammar rules can be grammar rules that have been wholly or partially generated, where the grammar rules that are re-written are selected using a user model or heuristics.

The new grammar rules comprising the dictation language model grammar rules can then be employed for identifying and recognizing OOG user utterances. Although the CFG rules can generally recognize user utterances with better performance than the dictation language model grammar rules, the CFG rules can have difficulty processing OOG user utterances. Specifically, the CFG rules can drastically constrain the search space of possible expressions, such that if a user produces an utterance that is covered by the CFG rules, the CFG rules can generally recognize it with better performance than the dictation language model grammar rules, which can generally have a much larger search space. However, OOG user utterances can cause the CFG rules to produce a recognition result with very low confidence or no result at all, as the OOG user utterance does not fall within the pre-conscribed CFG rules. Whereas, the dictation language model grammar rules employing the re-written grammar rules can typically process the OOG user utterance and produce a recognition result with much higher confidence.

Specifically, if the CFG rules fail to come up with an acceptable recognition result (e.g., with high enough confidence or some other measure of reliability), then the system 300 can determine if the dictation grammar result contains a keyword or slot that can distinctly identify the intended rule, or if dictation tags are employed, determine which rule can be the most likely match. Alternatively, instead of using exact matching of keywords, the system 300 can derive a measure of phonetic similarity between dictation text and the keywords (e.g., approximate matching).

Furthermore, once the correct grammar rule is identified, a personalization component 306 can be employed to update the CFG rules with the revised recognition results. The CFG rules can also be modified to eliminate phrases that are not commonly employed by the user and augmented with phrases that users do utilize so that it remains relatively small in size to ensure better search performance. Thus, the CFG rules can be tailored specifically for each individual user.

Additionally, the CFG rules can be updated by various means. For example, the system 300 can query the user to add various parts of the dictation text to the CFG rules in various positions to create new grammar rules, or the system 300 can automatically add the dictation text in the proper places. Even if the dictation language model grammar rules fail to find a keyword, if the system 300 has a predictive user model which can relay the most likely command irrespective of speech, then the system 300 can engage in a confirmation of the command with the user. If the confirmation is affirmed, the system 300 can add whatever is heard by the dictation language model grammar rules to the CFG rules. Specifically, the predictive user model predicts what goal or action speech application users are likely to pursue given various components of a speech recognition application. These predictions are based in part on past user behavior (e.g., systematic patterns of usage displayed by the user).

Accordingly, the dictation language model grammar rules can be used in combination with the CFG rules to identify and recognize all user utterances in the speech recognition application, as well as update the CFG rules with the revised recognition results. Further, once the user utterances are identified and recognized, the updated results can be output as speech and/or action/multimedia functionality for the speech recognition application to perform.

Figure 4:
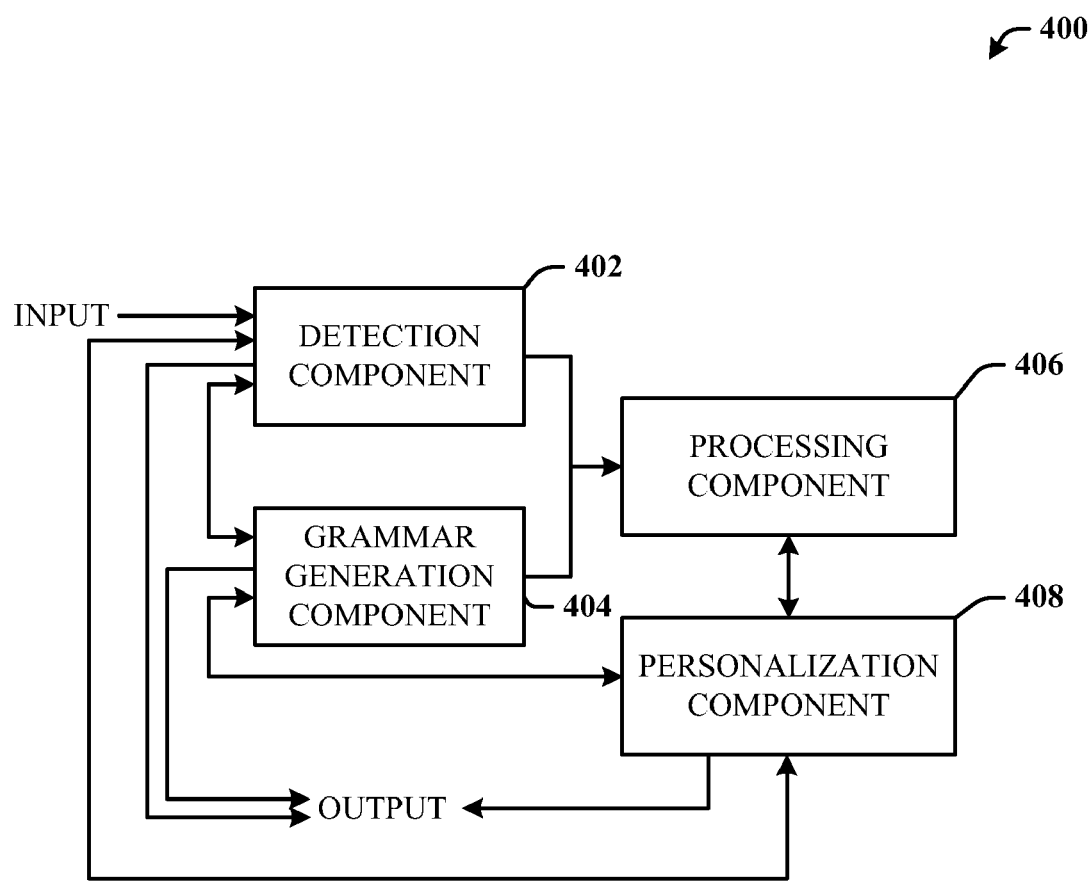
FIG. 4 illustrates a block diagram of the system that further includes a processing component for processing an OOG utterance using a dictation language model.

In another implementation illustrated in FIG. 4, a system 400 generates the dictation language model grammar rules in a speech recognition application which further includes a processing component 408. As stated supra, a detection component 402 (similar to detection component 302) can identify OOG user utterances from the input user utterances. Once an OOG user utterance is detected, a grammar generation component 404 can generate a new grammar rule based in part on the OOG user utterance. The new grammar rules comprise the dictation language model grammar rules. The processing component 408 can then process the OOG user utterances based in part on the re-written grammar rules of the dictation language model grammar rules to produce a recognition result with higher confidence than that obtained by the CFG rules. Typically, both the CFG rules and the dictation language model grammar rules can process all user utterances in the speech recognition application. However, the CFG rules and the dictation language model rules can process the OOG user utterances in numerous ways.

For example, the system 400 can first utilize the CFG rules to process the user utterance as a first pass, since the CFG rules generally perform better on computationally limited devices. If there is reason to believe that the user utterance is an OOG user utterance (as known via heuristics or a learned model), by saving a file copy of the user utterance (e.g., .wav file), the system 400 can process the user utterance immediately with the dictation language model grammar rules as a second pass. Alternatively, the system 400 can process the user utterance with the dictation language model grammar rules only after it has attempted to take action on the best recognition result (if any) using the CFG rules. Another implementation can be to have the system 400 engage in a dialog repair action, such as asking for a repeat or confirming its best guess, and then resorting to processing the user utterance via the dictation language model grammar rules. Still another construction can be to use both the CFG rules and the dictation language model grammar rules simultaneously to process the user utterance. Thus, with the addition of the dictation language model grammar rules the system 400 can have more options for identifying and recognizing OOG user utterances.

Furthermore, once the OOG user utterances are recognized, a personalization component 406 can be employed to update the CFG rules with the revised recognition results. The CFG rules can also be pruned to eliminate phrases that are not commonly employed by the user so that it remains relatively small in size to ensure better search performance. Thus, the CFG rules can be tailored specifically for each individual user.

FIGS. 5-11 illustrate methodologies of generating BOG language model rules for recognizing OOG user utterances and updating the CFG rules with the OOG user utterances according to various aspects of the innovation. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 5:
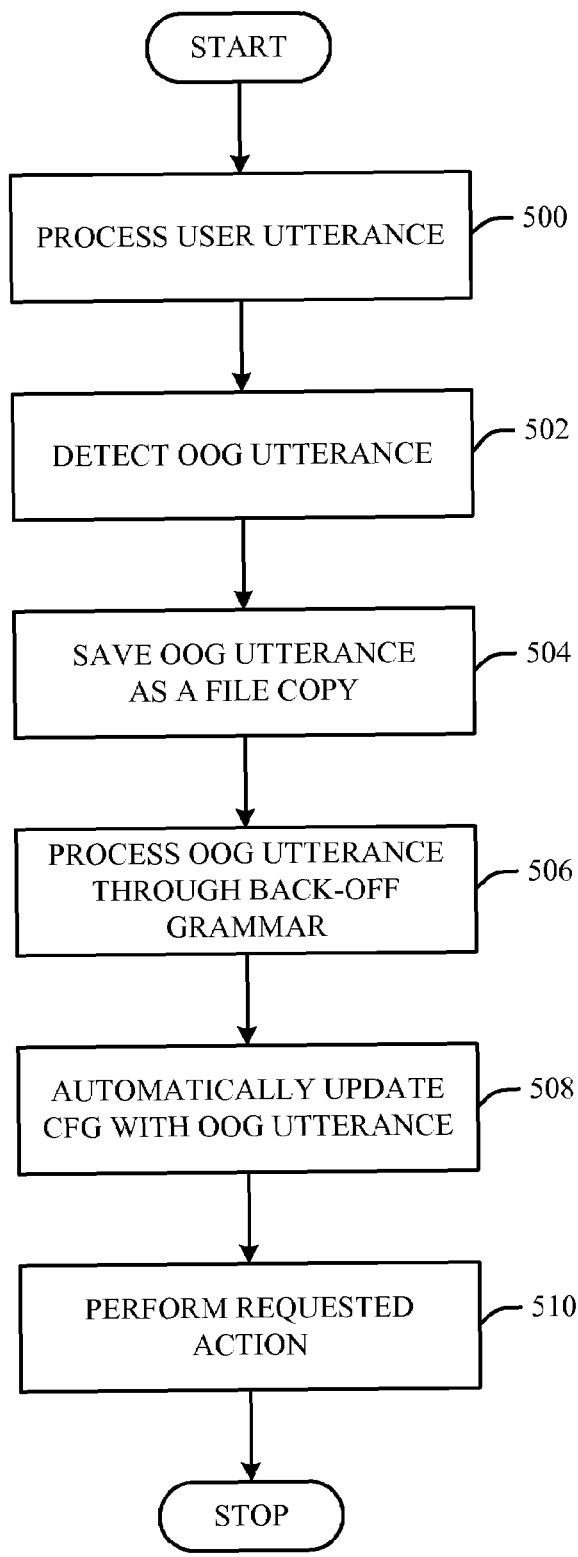
FIG. 5 illustrates a flow chart of a methodology of generating grammars.

Referring to FIG. 5, a method of integrating a BOG to recognize OOG utterances is illustrated. At 500, a user utterance is processed through a CFG. User utterances include, but are not limited to, grammar-containing phrases, spoken utterances, commands and/or questions and utterances vocalized to music. It is thus to be understood that any suitable audible output that can be vocalized by a user is contemplated and intended to fall under the scope of the hereto-appended claims. The CFG defines grammar rules which specify the words and patterns of words to be listened for and recognized. As indicated above, in general, the CFG consists of at least three constituent parts, carrier phrases, keywords and slots. Carrier phrases are text that is used to allow more natural expressions than just stating keywords and slots (e.g., "what is," "tell me," etc.). Keywords are text that allows a command or slot from being distinguished from other commands or slots (e.g., "battery"). Slots are dynamically adjustable lists of text items (e.g., <contact name>, <date>, etc.). Accordingly, based in part on the input user utterance and the CFG grammar rules, the CFG would process the user utterance and produce a recognition result with high confidence, a recognition result with low confidence or no recognition result at all.

At 502, an OOG user utterance is detected. An OOG user utterance is identified from a failed or low confidence recognition result from the CFG. Alternatively, a specialized component can be built to identify an OOG user utterance. The OOG user utterances are user expressions that fall outside of the CFG grammar rules, and as such are not recognized by the CFG. For example, if the CFG grammar rules are authored to anticipate the expression "What is my battery strength?" for reporting device power, then a user utterance of "Please tell me my battery strength." would not be recognized by the CFG and would be delineated as an OOG utterance. Specifically, based on this OOG user utterance and the CFG grammar rules, the CFG would either produce a recognition result with very low confidence or no result at all.

At 504, the OOG user utterance is saved as a file copy of the user utterance. By saving a file copy of the user utterance (e.g., .wav file), the user utterance can be immediately processed through the BOG. And at 506, the OOG user utterance is processed through the BOG. The BOG is generated based on new grammar rules. Specifically, the new grammar rules are created by adding filler tags before and/or after keywords and slots. Filler tags can be based on both garbage tags and/or dictation tags. For example, a CFG rule for reporting device power: "What is {my|the} battery {strength}|level}?" can be re-written as "... battery ..." or "*battery" in a new grammar rule. Alternatively, new grammar rules can be based on phonetic similarity to keywords, instead of exact matching of keywords (e.g., approximate matching). Accordingly, the BOG can be comprised of grammar rules that have been wholly or partially generated, where the grammar rules that are re-written are selected using a user model or heuristics. The new grammar rules in the BOG can then be employed for identifying and recognizing OOG user utterances.

At 508, the CFG is automatically updated with the OOG user utterances. The CFG grammar rules can be automatically updated by adding various parts of the dictation text to the CFG grammar rule(s) in various positions to create new grammar rule(s). Even if the BOG fails to match a keyword, if the speech recognition application has a predictive user model (add definition) which can relay the most likely command irrespective of speech, a confirmation of the command can be engaged with the user, and if the confirmation is affirmed, whatever is heard by the dictation language model can be automatically added to the CFG. As stated supra, the predictive user model predicts what goal or action speech application users are likely to pursue given various components of a speech recognition application. These predictions are based in part on past user behavior (e.g., systematic patterns of usage displayed by the user). Furthermore, the CFG could also be pruned to eliminate phrases that are not commonly used by the user so that it remains relatively small in size to ensure better search performance. Finally at 510, the requested action is performed. Accordingly, once the user utterances are identified and recognized, the updated results are processed and the requested speech and/or action/multimedia functionality is performed.

Figure 6:
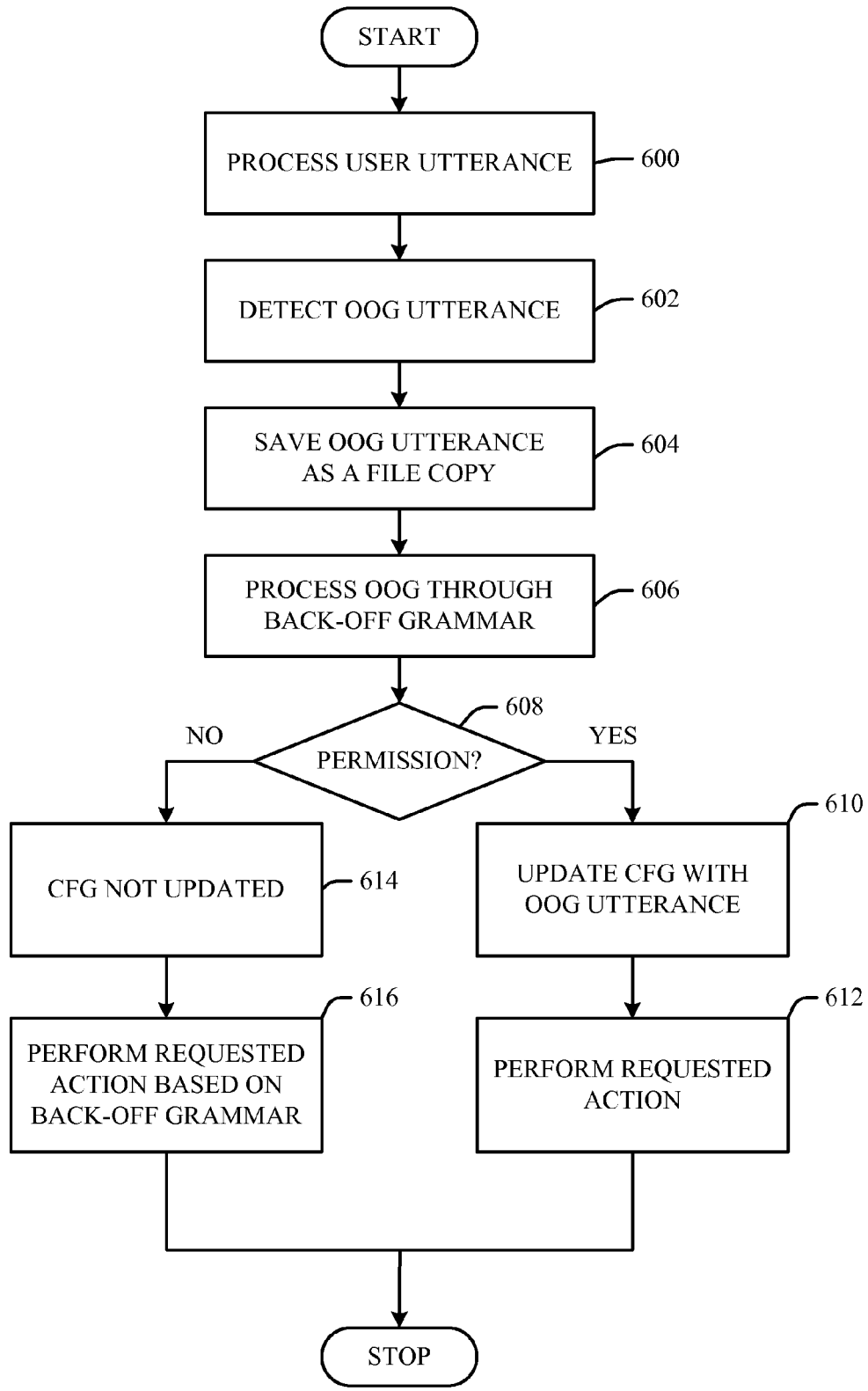
FIG. 6 illustrates a flow chart of the methodology of updating a CFG.

Referring to FIG. 6, a method of integrating a BOG to recognize OOG user utterances is illustrated. At 600, a user utterance is processed through a CFG. User utterances include, but are not limited to, grammar-containing phrases, spoken utterances, commands and/or questions and utterances vocalized to music. The CFG defines grammar rules which specify the words and patterns of words to be listened for and recognized. Accordingly, the CFG processes the user utterance and produces a recognition result with high confidence, a recognition result with low confidence or no recognition result at all.

At 602, an OOG user utterance is detected. An OOG user utterance is identified from a failed or low confidence recognition result from the CFG. Alternatively, a specialized component can be built to identify an OOG user utterance. The OOG user utterances are user expressions that fall outside of the CFG grammar rules, and as such are not recognized by the CFG. At 604, the OOG user utterance is saved as a file copy of the user utterance (e.g., .wav file). And at 606, the OOG user utterance is processed through the BOG. The BOG is generated based in part on the new grammar rules. The new grammar rules are created by adding filler tags before and/or after keywords and slots. Filler tags can be based on both garbage tags and/or dictation tags. Alternatively, new grammar rules can be based on phonetic similarity to keywords, instead of exact matching of keywords (e.g., approximate matching). Accordingly, the BOG can be grammar rules that have been wholly or partially generated. The BOG comprising the new grammar rules can then be employed for identifying and recognizing OOG user utterances.

Further, the CFG can then be updated with the OOG user utterances. At 608, a user is queried for permission to update the CFG with the OOG user utterances. Specifically, the user is asked whether various parts of the dictation text should be added to the CFG in various positions to create new grammar rule(s). If the user responds in the affirmative, then at 610 the CFG is updated with the OOG utterances. Furthermore, the CFG could also be pruned to eliminate phrases that are not commonly used by the user so that it remains relatively small in size to ensure better search performance. At 612, the requested action is performed. Accordingly, once the user utterances are identified and recognized, the updated results are processed and the requested speech and/or action/multimedia functionality is performed. If the user responds in the negative, then at 614 the CFG is not updated with the user utterances. At 616, the requested speech and/or action/multimedia functionality is performed based on the recognition results from the BOG.

Figure 7:
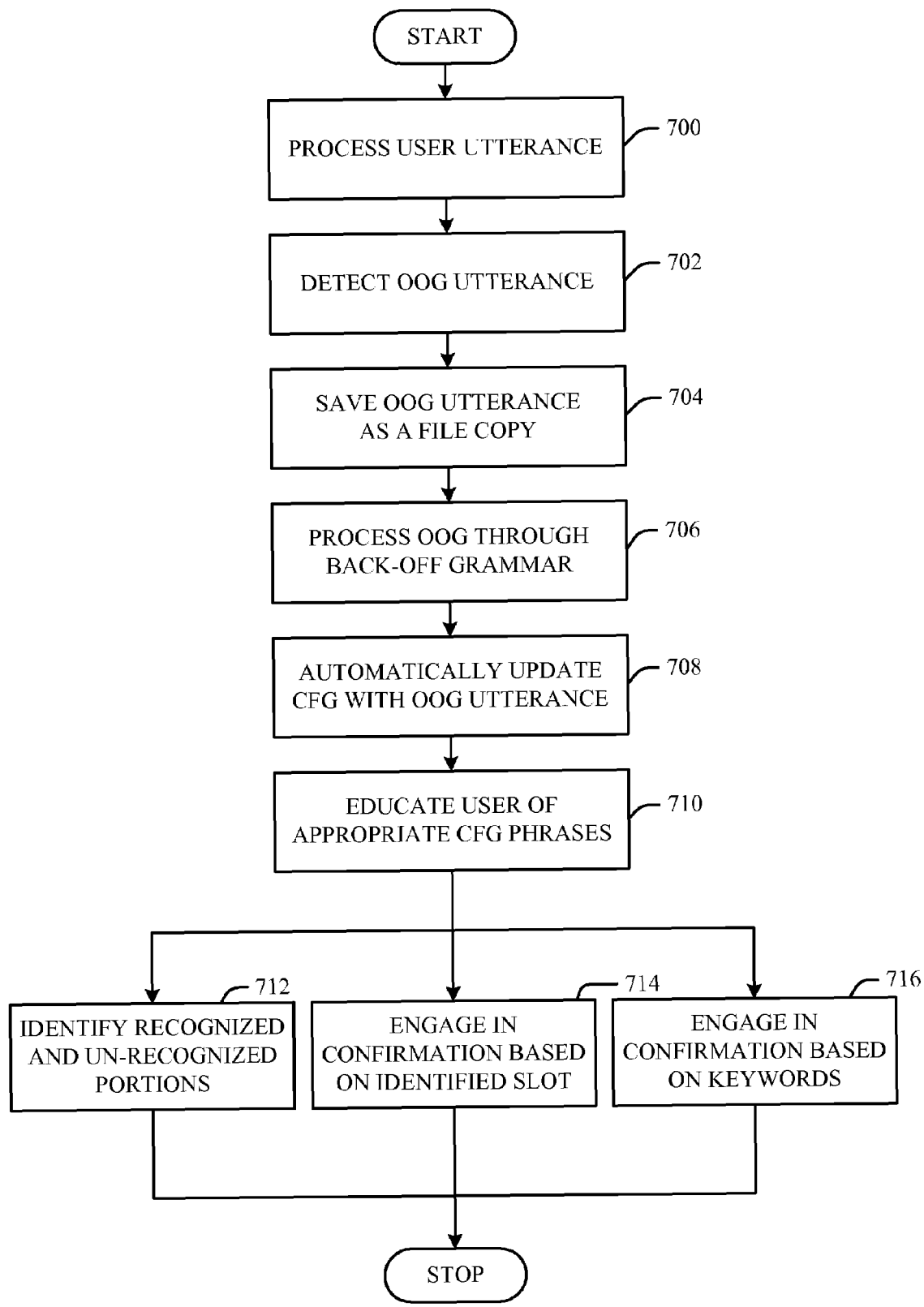
FIG. 7 illustrates a flow chart of the methodology of educating the user for correcting CFG phrases.

Referring to FIG. 7, a method of integrating a BOG to recognize OOG user utterances is illustrated. At 700, a user utterance is processed through a CFG. User utterances include, but are not limited to, grammar-containing phrases, spoken utterances, commands and/or questions and utterances vocalized to music. The CFG defines grammar rules which specify the words and patterns of words to be listened for and recognized. Accordingly, the CFG processes the user utterance and produces a recognition result with high confidence, a recognition result with low confidence or no recognition result at all.

At 702, an OOG user utterance is detected. An OOG user utterance is identified from a failed or low confidence recognition result from the CFG. Alternatively, a specialized component can be built to identify an OOG user utterance. The OOG user utterances are user expressions that fall outside of the CFG grammar rules, and as such are not recognized by the CFG. At 704, the OOG user utterance is saved as a file copy of the user utterance (e.g., .wav file). And at 706, the OOG user utterance is processed through the BOG. The BOG is generated based in part on the new grammar rules. The new grammar rules are created by adding filler tags before and/or after keywords and slots. Filler tags can be based on both garbage tags and/or dictation tags. Alternatively, new grammar rules can also be based on phonetic similarity to keywords, instead of exact matching of keywords (e.g., approximate matching). Accordingly, the BOG can be comprised of grammar rules that have been wholly or partially generated. The BOG comprising the new grammar rules can then be employed for identifying and recognizing OOG user utterances.

At 708, the CFG is automatically updated with the OOG user utterances. The CFG grammar rules can be automatically updated by adding various parts of the dictation text to the CFG grammar rule(s) in various positions to create new grammar rule(s). Even if the BOG fails to match a keyword, if the speech recognition process has a predictive user model which can relay the most likely command irrespective of speech, a confirmation of the command can be engaged with the user, and if the confirmation is correct, whatever is heard by the dictation language model can be automatically added to the CFG. Furthermore, the CFG could also be modified to eliminate phrases that are not commonly used by the user so that it remains relatively small in size to ensure better search performance.

At 710, users are educated of appropriate CFG phrases. Users can be educated of legitimate and illegitimate CFG phrases. At 712, the speech recognition process indicates all portions (e.g., words and/or phrases) of the user utterance that has been recognized by the CFG, and those that have not been recognized or produce a low confidence recognition result. As such, a user is made aware of the legitimate CFG words and/or phrases. At 714, the speech recognition process engages the user in a confirmation based on an identified slot. For example, if the BOG rules detect just the contact slot via a specific back-off grammar rule such as " . . . <contact>" and the speech recognition application knows that there are only two rules that contain that slot. If the user uttered "Telephone Tom Smith" when the only legitimate keywords for that slot are "Call" and "Show," the speech recognition process could engage in the confirmation, "I heard Tom Smith. You can either Call Tom Smith, or Show Tom Smith." The user would then reply with the correct grammar command, and would be educated on the legitimate CFG phrases.

At 716, the speech recognition process engages the user in a confirmation based on an identified keyword. For example, if the BOG rules detect just the keyword via a specific back-off grammar rule such as " . . . <battery>" and the speech recognition application knows that there is only one rule that contains that keyword. If the user uttered "Please tell me how much battery I have left" when the only legitimate CFG rule is "What is my battery strength?" the speech recognition process could engage in the confirmation, "I heard the word 'battery'. You can request the battery level of this device by stating "Please tell me how much battery I have left." The user would then reply with the correct CFG command phrase, and would be educated on the legitimate CFG phrases.

Figure 8:
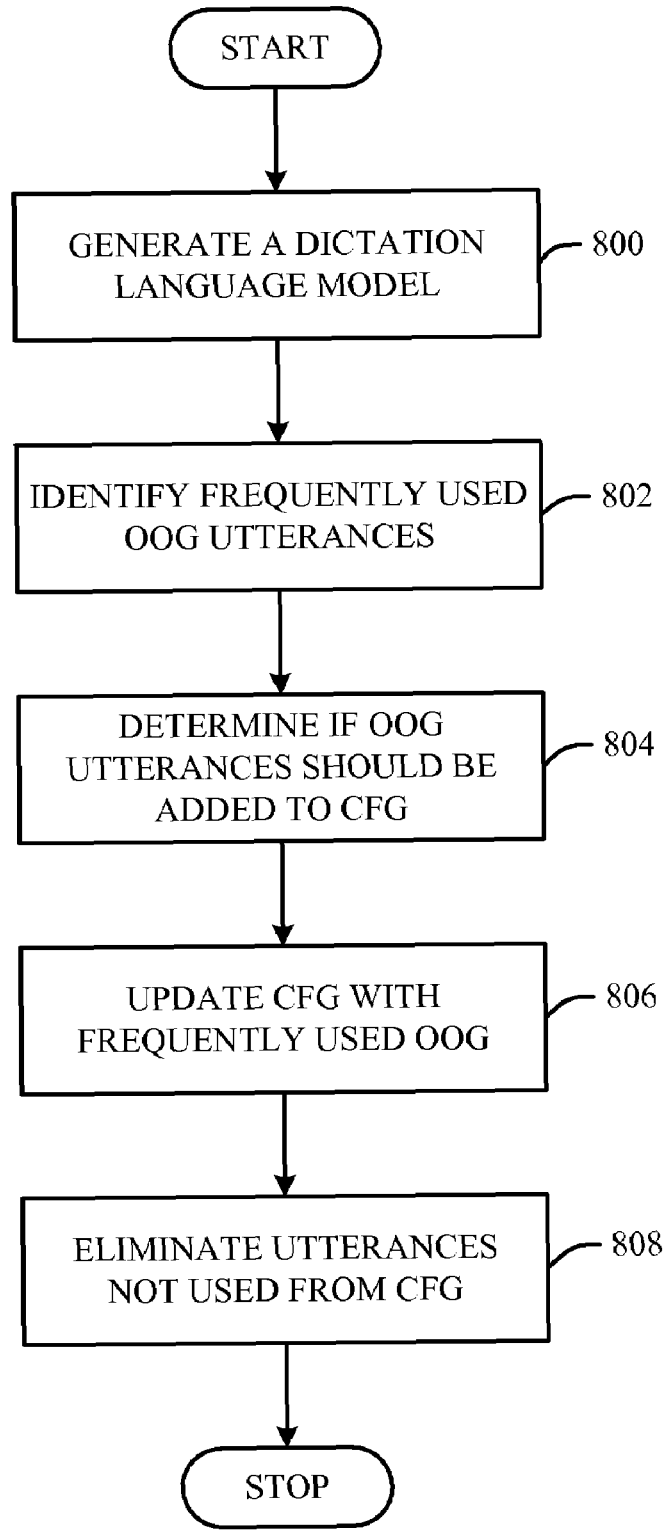
FIG. 8 illustrates a flow chart of a methodology of personalizing a CFG.

Referring to FIG. 8, a method for using a dictation language model to personalize a CFG is illustrated. At 800, a dictation language model is generated. The dictation language model is generated based in part on new grammar rules. Specifically, the new grammar rules are created by adding filler tags based on dictation tags (e.g., dictation tags) before and/or after keywords and slots. Alternatively, new grammar rules can also be based on phonetic similarity to keywords, instead of exact matching of keywords (e.g., approximate matching). Accordingly, the dictation language model can be grammar rules that have been wholly or partially generated, where the grammar rules that are re-written are selected using a user model or heuristics. The new grammar rules in the dictation language model can then be employed for identifying and recognizing OOG user utterances.

At 802, frequently used OOG user utterances are identified. An OOG user utterance is identified from a failed or low confidence recognition result from the CFG. Alternatively, a specialized component can be built to identify an OOG user utterance. At 804, it is determined if the OOG user utterance should be added to the CFG. If the OOG user utterance is frequently used by the speech recognition application and/or the results are predicted by a predictive user model, then the OOG user utterance should be added to the CFG. At 806, the CFG is updated with the frequently used OOG user utterance. One implementation for updating the CFG is to either automatically add phrases to the CFG or do so with permission. The CFG grammar rules can be automatically updated by adding various parts of the dictation text to the CFG grammar rule(s) in various positions to create new grammar rule(s). Alternatively, a user can be queried for permission to update the CFG with the OOG user utterances. Specifically, the user is asked whether various parts of the dictation text should be added to the CFG in various positions to create new grammar rule(s).

If the user responds in the affirmative, then the CFG is updated with the OOG utterances. Even if the dictation language model fails to match a keyword, if the speech recognition process has a predictive user model which can relay the most likely command irrespective of speech, a confirmation of the command can be engaged with the user, and if the confirmation is affirmed, whatever is heard by the dictation language model can be automatically added to the CFG. Furthermore, at 808, utterances/phrases not frequently employed by the user can be eliminated from the CFG. Specifically, the CFG can be modified to eliminate phrases that are not commonly employed by the user and augmented with phrases that users do utilize so that it remains relatively small in size to ensure better search performance.

Figure 9:
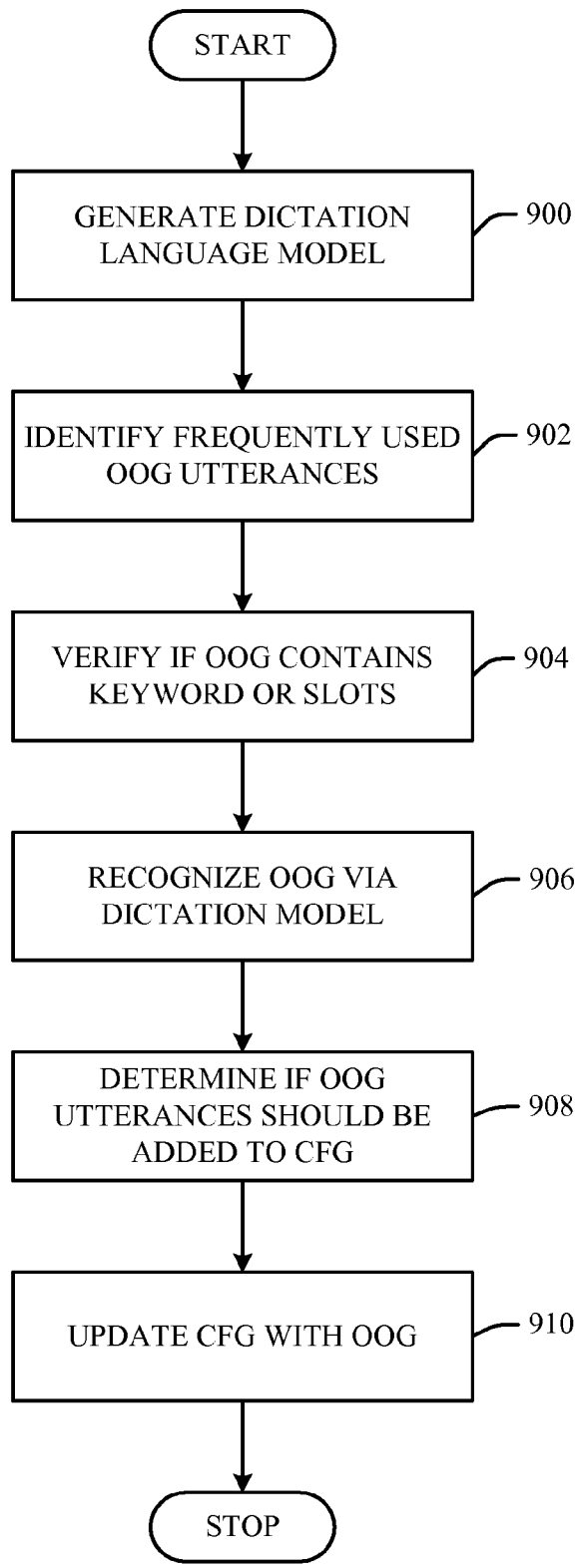
FIG. 9 illustrates a flow chart of the methodology of identifying keyword and/or slots in an OOG utterance.

Referring to FIG. 9, a method for using a dictation language model to personalize a CFG is illustrated. At 900, a dictation language model is generated. The dictation language model is generated based on new grammar rules created by adding filler tags based on dictation tags (e.g., dictation tags) before and/or after keywords and slots. Alternatively, a new grammar rule can also be based on phonetic similarity to keywords, instead of exact matching of keywords (e.g., approximate matching). Accordingly, the dictation language model can be comprised of grammar rules that have been wholly or partially generated, where the grammar rules that are re-written are selected using a user model or heuristics. The new grammar rules in the dictation language model can then be employed for identifying and recognizing OOG user utterances.

At 902, frequently used OOG user utterances are identified. The OOG user utterances are user expressions that fall outside of the CFG grammar rules, and as such are not recognized by the CFG. An OOG user utterance is identified from a failed or low confidence recognition result from the CFG. Alternatively, a specialized component can be built to identify an OOG user utterance. At 904, the OOG user utterance is parsed to identify keywords and/or slots. Specifically, it is verified that the OOG user utterance contains a keyword and/or slot that distinctly identifies an intended rule. Once the keyword and/or slot are identified, at 906, the OOG user utterance is recognized via the dictation language model. The dictation language model processes the OOG user utterances by identifying keywords and/or slots and the corresponding intended rule. Accordingly, once the user utterances are identified and recognized, the updated results are processed and the requested speech and/or action/multimedia functionality is performed.

At 908, it is determined if the OOG user utterance should be added to the CFG. If the OOG user utterance is frequently used by the speech recognition application user and/or the results are predicted by a predictive user model, then the OOG user utterance should be added to the CFG. At 910, the CFG is updated with the frequently used OOG user utterance. One implementation for updating the CFG is to either automatically add phrases to the CFG or do so with permission. The CFG grammar rules can be automatically updated by adding various parts of the dictation text to the CFG grammar rule(s) in various positions to create new grammar rule(s). Alternatively, a user can be queried for permission to update the CFG with the OOG user utterances. Specifically, the user is asked whether various parts of the dictation text should be added to the CFG in various positions to create new grammar rule(s). If the user responds in the affirmative, then the CFG is updated with the OOG utterances.

Figure 10:
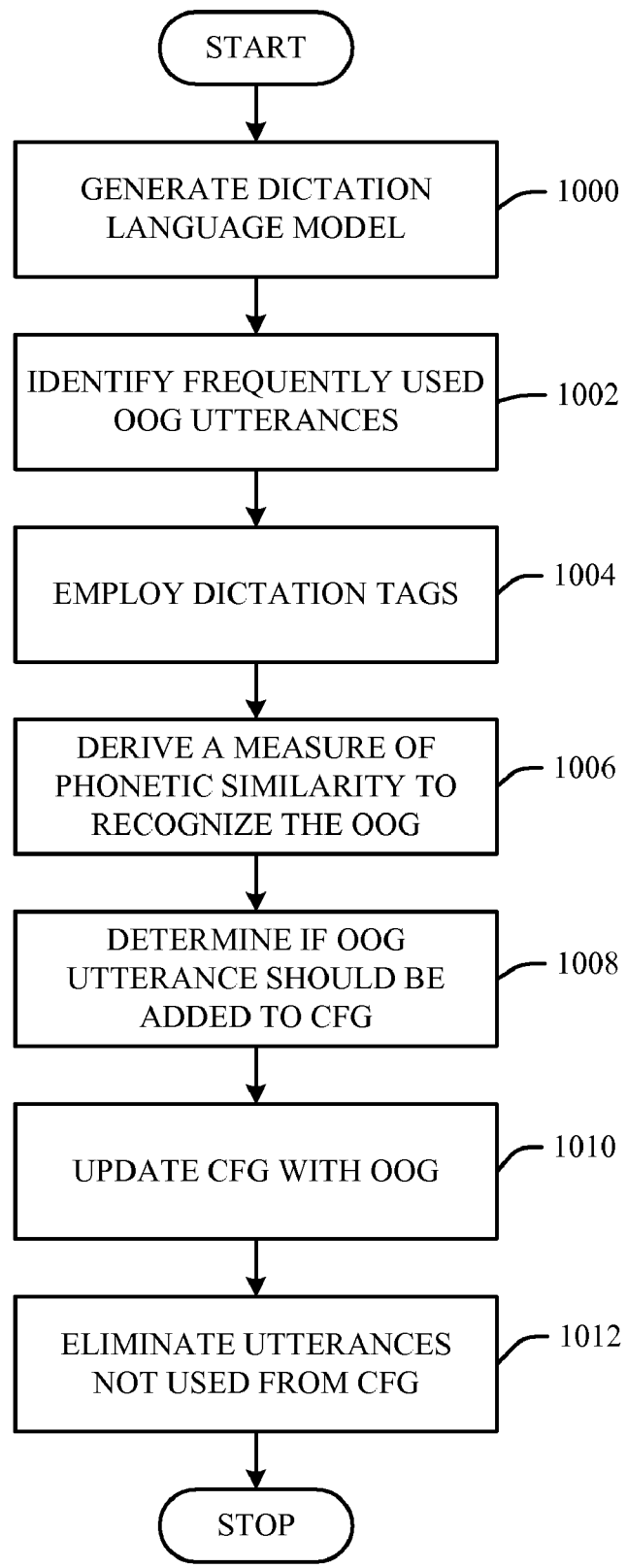
FIG. 10 illustrates a flow chart of the methodology of employing dictation tags in the OOG utterance.

Referring to FIG. 10, a method for using a dictation language model to personalize a CFG is illustrated. At 1000, a dictation language model is generated. The dictation language model is generated based on new grammar rules. Alternatively, new grammar rules can also be based on phonetic similarity to keywords, instead of exact matching of keywords (e.g., approximate matching). Accordingly, the dictation language model can be comprised of grammar rules that have been wholly or partially generated, where the grammar rules that are re-written are selected using a user model or heuristics. The new grammar rules in the dictation language model can then be employed for identifying and recognizing OOG user utterances.

At 1002, frequently used OOG user utterances are identified. The OOG user utterances are user expressions that fall outside of the CFG grammar rules, and as such are not recognized by the CFG. An OOG user utterance is identified from a failed or low confidence recognition result from the CFG. Alternatively, a specialized component can be built to identify an OOG user utterance. At 1004, the OOG user utterance is parsed to identify keywords and/or slots and employ dictation tags. Once the new grammar rules are created, the dictation tags are employed to determine which rule is most likely the intended rule for the OOG user utterance. Further, at 1006, a measure of phonetic similarity between the OOG user utterance and identified keywords is derived by the dictation language model. Generally, the dictation language model verifies which rule is the most likely match for the dictation tags employed. Alternatively, instead of using exact matching of keywords, the dictation language model can derive a measure of phonetic similarity between dictation text and the keywords (e.g., approximate matching). The dictation language model then processes the OOG user utterances by identifying keywords and/or slots and the corresponding intended rule. Accordingly, once the OOG user utterances are identified and recognized, the updated results are processed and the requested speech and/or action/multimedia functionality is performed.

At 1008, it is determined if the OOG user utterance should be added to the CFG. If the OOG user utterance is frequently used by the speech recognition application user and/or the results are predicted by a predictive user model, then the OOG user utterance should be added to the CFG. At 1010, the CFG is updated with the frequently used OOG user utterance. One possibility of updating the CFG is to either automatically add phrases to the CFG or do so with permission. The CFG grammar rules can be automatically updated by adding various parts of the dictation text to the CFG grammar rule(s) in various positions to create new grammar rule(s). Or, a user is queried for permission to update the CFG with OOG user utterances. Specifically, the user is asked whether various parts of the dictation text should be added to the CFG in various positions to create new grammar rule(s). If the user responds in the affirmative, then the CFG is updated with the OOG utterances. Furthermore, at 1012, utterances/phrases not frequently employed by the user can be eliminated from the CFG. Specifically, the CFG can be modified to eliminate phrases that are not commonly employed by the user and augmented with phrases that users do utilize so that it remains relatively small in size to ensure better search performance.

Figure 11:
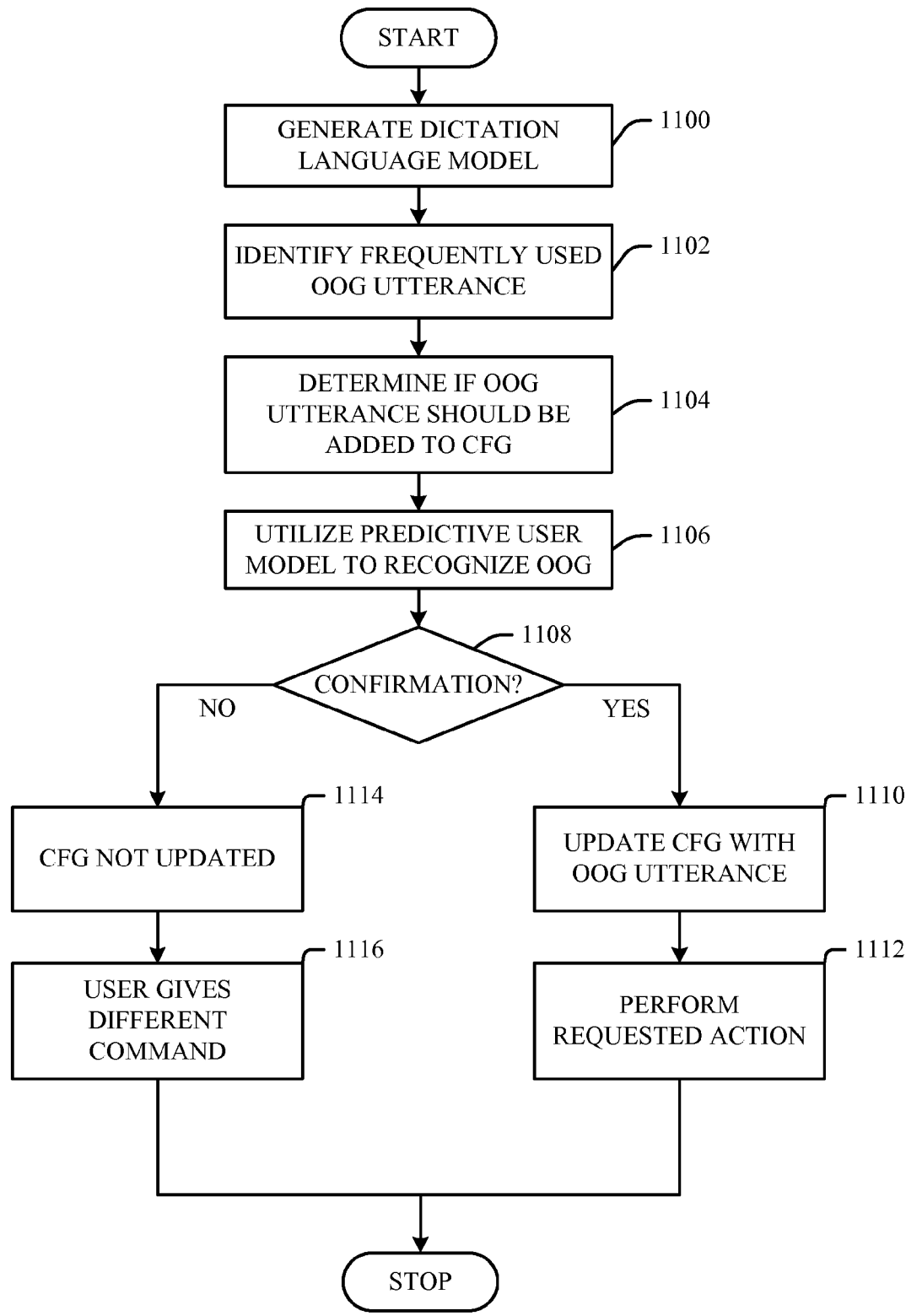
FIG. 11 illustrates a flow chart of the methodology of recognizing the OOG utterance via a predictive user model.

Referring to FIG. 11, a method for using a dictation language model to personalize a CFG is illustrated. At 1100, a dictation language model is generated. The dictation language model is generated based on new grammar rules. Alternatively, new grammar rules can also be based on phonetic similarity to keywords, instead of exact matching of keywords (e.g., approximate matching). Accordingly, the dictation language model can be comprised of grammar rules that have been wholly or partially generated, where the grammar rules that are re-written are selected using a user model or heuristics. The new grammar rules in the dictation language model can then be employed for identifying and recognizing OOG user utterances.

At 1102, frequently used OOG user utterances are identified. The OOG user utterances are user expressions that fall outside of the CFG grammar rules, and as such are not recognized by the CFG. An OOG user utterance is identified from a failed or low confidence recognition result from the CFG. Alternatively, a specialized component can be built to identify an OOG user utterance. At 1104, it is determined if the OOG user utterance should be added to the CFG. If the OOG user utterance is frequently used by the speech recognition application user and/or the results are predicted by a predictive user model, then the OOG user utterance should be added to the CFG. Generally, the CFG is updated with the frequently used OOG user utterances either by automatically adding phrases or by querying the user for permission.

However even if the dictation language model fails to match a keyword, then at 1106, a predictive user model is employed to recognize the OOG user utterance. The predictive user model predicts what goal or action speech application users are likely to pursue given various components of a speech recognition application. These predictions are based in part on past user behavior (e.g., systematic patterns of usage displayed by the user). Specifically, the predictive user model relays the most likely command intended irrespective of speech. Once the predictive results are produced, then at 1108 a confirmation of the command is engaged with the user. If the user responds in the affirmative, then at 1110 the CFG is updated with the predicted results recognized from the OOG user utterance. Thus, whatever is processed by the predictive user model can be automatically added to the CFG. Furthermore, the CFG could also be pruned to eliminate phrases that are not commonly employed by the user so that it remains relatively small in size to ensure better search performance. Thus, the CFG can be tailored specifically for each individual user.

At 1112, the requested action is performed. Accordingly, once the user utterances are identified and recognized, the updated results are processed and the requested speech and/or action/multimedia functionality is performed. If the user responds in the negative, at 1108, then at 1114 the CFG is not updated with the user utterances. And at 1116, the user inputs a different variation of the command and/or utterance in order for the intended action to be performed.

Figure 12:
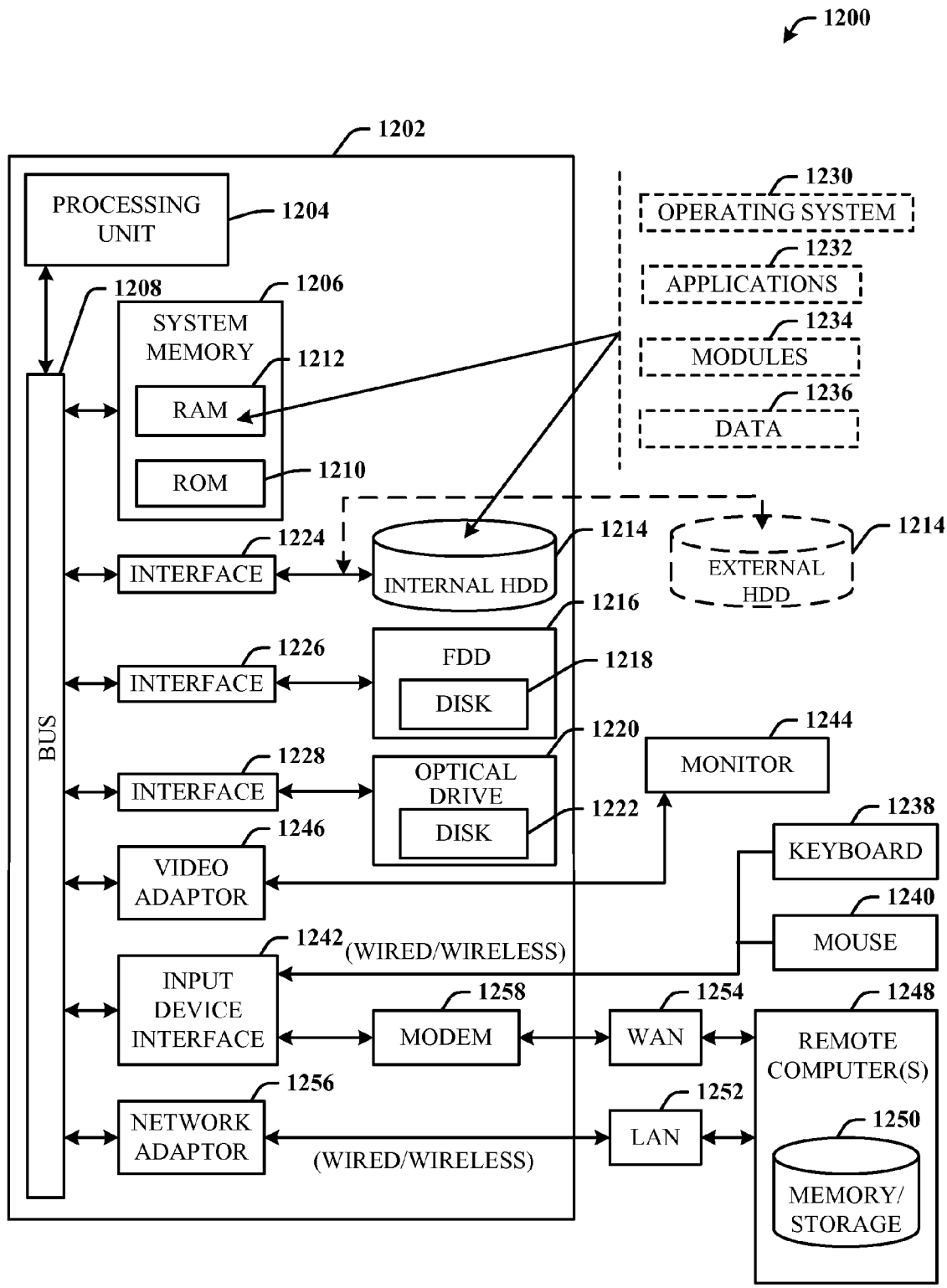
FIG. 12 illustrates a block diagram of a computer operable to execute the disclosed BOG generating architecture.

Referring now to FIG. 12, there is illustrated a block diagram of a computer operable to execute the disclosed grammar generating architecture. In order to provide additional context for various aspects thereof, FIG. 12 and the following discussion are intended to provide a brief, general description of a suitable computing environment 1200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1202 through one or more wired/wireless input devices (e.g., a keyboard 1238 and a pointing device, such as a mouse 1240). Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks (e.g., a wide area network (WAN) 1254). Such LAN and WAN networking environments are commonplace in offices and companies, and facilitate enterprise-wide computer networks, such as intranets, all of which may connect to a global communications network (e.g., the Internet).

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices (e.g., computers) to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
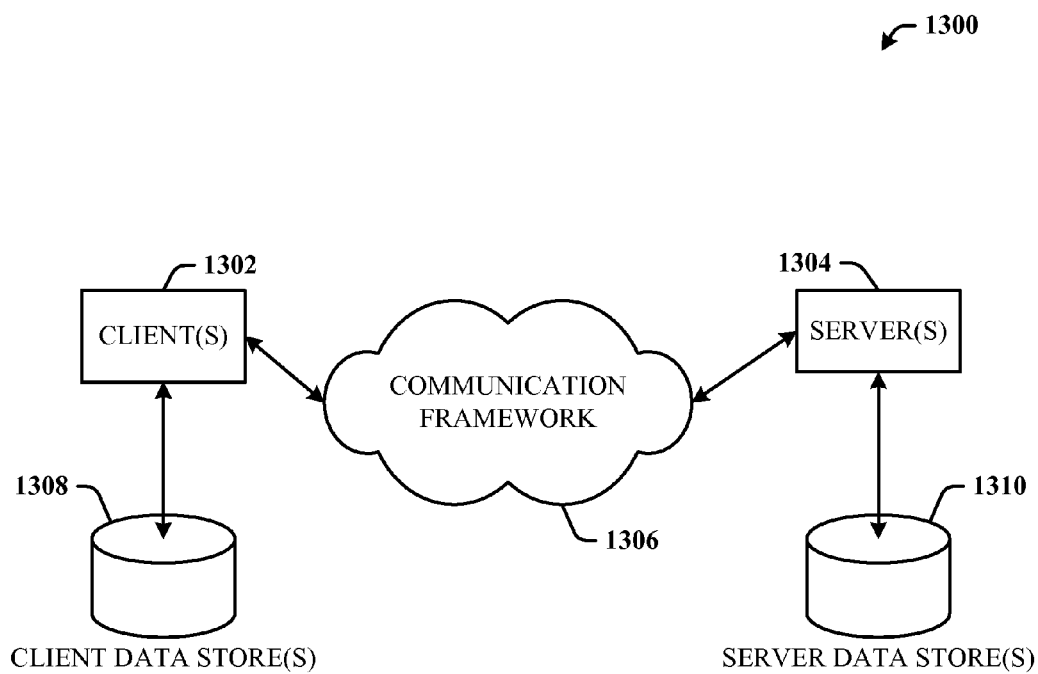
FIG. 13 illustrates a schematic block diagram of an exemplary computing environment for use with the BOG generating system.

Referring now to FIG. 13, there is illustrated a schematic block diagram of an exemplary computing environment 1300 in accordance with another aspect. The system 1300 includes one or more client(s) 1302. The client(s) 1302 can be hardware and/or software (e.g., threads, processes, computing devices). The client(s) 1302 can house cookie(s) and/or associated contextual information by employing the subject innovation, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for generating a dictation language model in speech recognition applications, comprising:
   a processor;
   memory operatively coupled to the processor;
   a detection component that identifies out-of-grammar (OOG) utterances, the OOG utterances are not recognized by context-free grammar (CFG) rules;
   a parsing component configured to identify a slot in the OOG utterances;
   a grammar generation component that generates a dictation language model by creating a new rule based in part on the OOG utterances, the grammar generation component configured to add a filler tag proximate to the slot to generate the new rule, wherein the slot is a dynamically adjustable list of text items, the slot references the rule to the list of text items, the slot being a direct object of the rule,
   wherein the filler tag represents an acoustic element in the OOG utterances, and the filler tag combines with the slot to create the new rule;
   a processing component that processes user utterances through the dictation language model before the CFG processes the utterances, the processing component further configured to communicate to a user all existing rules that contain the identified slot and receive from the user the user's selection of one of the existing rules; and
   a personalization component that updates old CFG rules with the new rule.

2. The system of claim 1, wherein the new rule is based in part on the OOG utterances and the old CFG rules, and wherein the personalization component is configured to eliminate utterances not frequently employed by the user from the CFG rules, and is further configured to specifically tailor the new rule to the user.

3. The system of claim 2, wherein only a portion of the CFG rules are re-written to generate the new rules.

4. The system of claim 1, wherein the filler tags are dictation tags.

5. The system of claim 1, wherein the new rules are created with filler tags that are based on words having a phonetic similarity to keywords.

6. A computer-implemented method for using a dictation language model to personalize a context-free grammar (CFG), comprising:
   generating a dictation language model based in part on out-of-grammar (OOG) utterances in a computing device employing a processor operatively coupled to memory;
   processing the OOG utterances on the computing device with the dictation language model before the CFG processes the OOG utterances;
   verifying if the OOG utterances contain a slot that distinctly identifies an intended CFG rule to be applied to process the OOG utterances, identifying the slot in the OOG utterances, wherein the slot is a dynamically adjustable list of text items that reference the CFG rule to the text items;
   tailoring the CFG rule for a user individually, the tailoring comprising:
      communicating to the user all existing rules that contain the identified slot and receiving from the user the user's selection of one of the existing rules;
      requesting permission from the user to update the CFG with phrases based in part on the OOG utterances, the requesting comprising asking the user whether to add various parts of dictation text to the CFG, in various positions within the CFG, to create a new grammar rule;
      updating the CFG with the phrases based in part on the OOG utterances if the user responds in the affirmative and not updating the CFG with the phrases based in part on the OOG utterances if the user responds in the negative;
      identifying OOG utterances frequently used by the user;
      determining if the OOG utterances frequently used by the user should be incorporated into the CFG;
      updating the CFG with the OOG utterances frequently used by the user; and
      eliminating utterances not frequently employed by the user from the CFG.

7. The method of claim 6, further comprising employing dictation tags to determine which rule is most likely an intended rule.

8. The method of claim 6, further comprising deriving a measure of phonetic similarity between the OOG utterance and keywords.

9. The method of claim 6, further comprising automatically updating the CFG with phrases based in part on the OOG utterances.

10. The method of claim 6, further comprising utilizing a predictive user model to determine the most likely command result based on the OOG utterances.

11. The method of claim 10, further comprising engaging in a confirmation of a predicted command result with the user.

12. The method of claim 11, wherein if the confirmation is correct, then automatically adding the command result to the CFG.

13. The method of claim 6, further comprising augmenting the CFG with utterances that the user does utilize.

14. A computer-implemented system for generating a dictation language model in command-and-control speech recognition applications, comprising:
   computer-implemented means for identifying out-of-grammar (OOG) utterances that are not recognized by context-free grammar (CFG) rules;
   computer-implemented means for generating new rules based in part on the OOG utterances, the means for generating new rules includes parsing the OOG utterances to identify keywords and slots, the slots are dynamically adjustable items of text lists and the keywords are text that allow a command or slot to distinguish from other commands or slots, the new rules include adding filler tags before or after the parsed keywords and parsed slots, the new rules are based in part on phonetic matching of keywords;

computer-implemented means for communicating to a user all existing rules that contain the identified slot and receiving from the user the user's selection of one of the existing rules;

computer-implemented means for requesting permission from the user to update the CFG rules with phrases based in part on the OOG utterances, the requesting comprising asking the user whether to add various parts of dictation text to the CFG, in various positions within the CFG, to create new grammar rules;

computer-implemented means for updating the CFG rules with the phrases based in part on the OOG utterances if the user responds in the affirmative and not updating the CFG rules with the phrases based in part on the OOG utterances if the user responds in the negative;

computer-implemented means for processing the OOG utterances with the new rules before processing by the CFG rules;

computer-implemented means for updating the CFG rules with the new rules;

computer-implemented means for tailoring the CFG rules for the user individually; and computer-implemented means for eliminating old rules from the CFG not frequently used by the user.

15. The computer-implemented system of claim 14, the new rules comprising a dictation grammar model generated in whole or in part.

16. The computer-implemented system of claim 14, the filler tags including dictation tags or garbage tags.

* * * * *